United States Patent [19]

Racz

[11] 3,930,806

[45] *Jan. 6, 1976

[54] LAMINATED COOKWARE UNITS

[75] Inventor: Nick S. Racz, Palos Park, Ill.

[73] Assignee: Burdett Manufacturing Company, Bridgeview, Ill.

[ * ] Notice: The portion of the term of this patent subsequent to Jan. 29, 1991, has been disclaimed.

[22] Filed: Jan. 24, 1973

[21] Appl. No.: 326,072

Related U.S. Application Data

[63] Continuation-in-part of Ser. No. 3,044, Jan. 15, 1970, Pat. No. 3,788,513.

[52] U.S. Cl. ............... 29/195; 29/196.2; 220/64
[51] Int. Cl.² .................................. B02D 20/14
[58] Field of Search ....... 29/196.2, 196, 196.1, 197, 29/191, 183, 195; 220/63, 64

[56] References Cited
UNITED STATES PATENTS

| | | | |
|---|---|---|---|
| 1,792,377 | 2/1931 | Jordan | 29/196.2 |
| 2,468,206 | 4/1949 | Keene | 29/196.1 |
| 2,664,874 | 1/1934 | Graham | 29/196.2 |
| 2,941,289 | 1/1960 | Chace | 29/196.1 |
| 3,173,202 | 3/1965 | Farber | 29/196.2 |
| 3,456,332 | 7/1969 | Belalov | 29/196.2 |
| 3,468,695 | 9/1969 | Federman | 29/196.2 |
| 3,490,126 | 1/1970 | Miller | 29/196.3 |
| 3,788,513 | 1/1974 | Aaez | 220/64 |

FOREIGN PATENTS OR APPLICATIONS

| | | | |
|---|---|---|---|
| 528,726 | 7/1931 | Germany | 29/196.2 |

*Primary Examiner*—C. Lovell
*Assistant Examiner*—Arthur J. Steiner
*Attorney, Agent, or Firm*—Molinare, Allegretti, Newitt & Witcoff

[57] ABSTRACT

A multiply durable laminated cookware unit includes components having a ferrous steel core ply roll plated with second and third aluminum plies which are softer and anodic relative to the core ply and which are bonded to the core ply under pressure so as to provide exposed surfaces on the unit which exhibit the properties of rolled solid aluminum sheets. The exposed edge of the steel core can be protected by drawing at least one of the softer anodic aluminum cover sheets such that it extends beyond the harder steel core and the extended portion of the aluminum sheet is folded over the steel core to seal the edge end of the steel core therebeneath.

11 Claims, 4 Drawing Figures

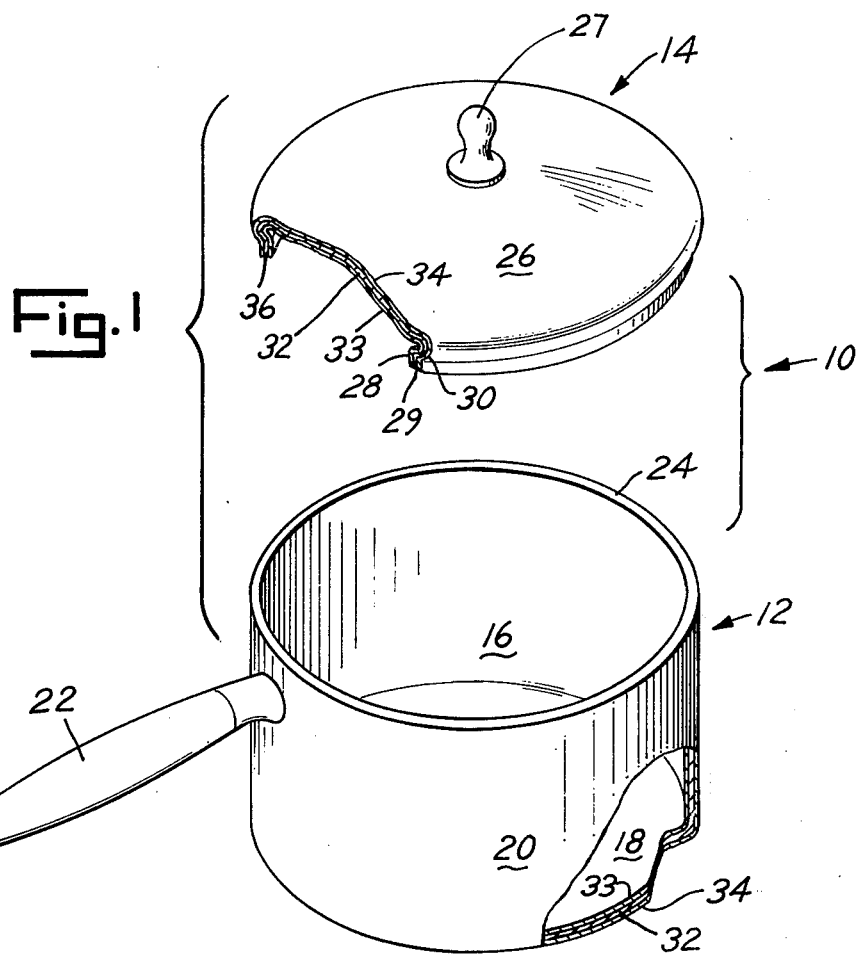
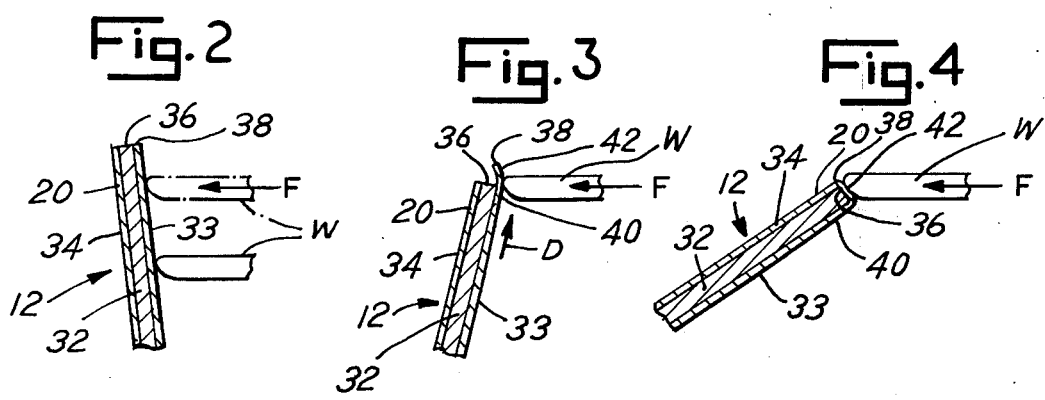

LAMINATED COOKWARE UNITS

OTHER RELATED APPLICATIONS

This application is a continuation-in-part of my copending application Ser. No. 3,044, filed Jan. 15, 1970, now U.S. Pat. No. 3,788,513.

BACKGROUND AND SUMMARY OF THE INVENTION

This invention relates to cookware and, more particularly, to durable laminated cookware components of roll plated multiply construction.

In my U.S. Pat. No. 3,788,513 laminated cookware constructions are disclosed in which inexpensive mild or carbon steel is employed as a core ply which is covered by thin plies of aluminum and/or other non-ferrous materials. These laminates minimize the use of the latter relatively expensive materials without detracting from the ability to fire the cookware at or near aluminum annealing temperatures for the purpose of sinter bonding porcelain enamels or sintered non-stick coating anchor frits to the container and without an attendant loss of container strength as the result of exposure to high sintering temperatures.

The present invention is directed to laminated cookware having all of the advantages of the construction as disclosed in U.S. Pat. No. 3,788,513 but offering additional advantages and improved performance features. In the present invention, cookware units are cold formed of a laminate in which the opposite sides of a steel core ply, such as for example a sheet of inexpensive carbon steel of deep drawing quality, are roll plated, clad or otherwise pressure bonded with sheets of commercially pure aluminum or sheets of aluminum alloys suitable for cookware use. Such novel cookware units made of roll plated laminated sheets of carbon steel and aluminum, which are suitably pressure bonded together, offer several advantages over utensils or cookware made of solid metal or other multiply materials, e.g. dip coated, spray coated or electrically deposited. The term roll plated as employed herein is intended to include laminate combinations which are made by pressure bonding sheets of carbon steel and pure aluminum or aluminum alloys suited for cookware.

Carbon steel cookware is susceptible to rust, unless protected with a suitable impervious coating. For this reason solid stainless steel or aluminum cookware is in widespread use. As noted in U.S. Pat. No. 3,788,513, although stainless steel cookware has a long life, it also exhibits inferior thermal conductivity and is much more expensive than either carbon steel or aluminum cookware. Accordingly, the more moderately priced aluminum utensils are popular.

Regardless, however, of the price, metal cookware should (1) withstand rusting or other corrosion to provide a long service life and prevent contamination of food, (2) be easily cleaned both inside and outside, and (3) have a sufficiently aesthetic appearance. In addition, cookware should also exhibit various thermal and mechanical properties such as noted in U.S. Pat. No. 3,788,513. For these reasons, uncoated metallic cookware must provide polishable surfaces which must be thoroughly polished to provide smooth surfaces which are free of crevices and pits both on the interior as well as the exterior of the utensil.

If the interior cooking surfaces are not smooth, food particles settle rapidly into even the smallest microscopic pits and crevices which make the utensil uncleanable, either by the normal cleaning procedures employed by the housewife or by dishwashing machines. The remnants of caked-on food particles promote the attraction of new particles to the unclean metal during successive cooking and will rapidly render the cookware unhygenic, unappetizing and stained and pose health risks to the members of the household, unless the utensil is thrown away. Disposal, in turn, produces ecologically undesirable solid wastes and necessitates the premature repurchase of replacements.

The exterior of uncoated utensils must also be polished for several reasons. First, it is not uncommon during cooking that food contents overrun the rim. Such overruns tend to cake onto the hot and usually dry exterior of the utensil firmly and instantaneously. Such caked-on food remnants are practically unremovable, unless the exterior surfaces of the pot are smooth and free of crevices or pits. Aside, however, from this functional prerequisite, it is also a commercial fact that the exterior of uncoated utensils must be polished because consumers buy only clean and shiny uncoated utensils. Thus, uncoated cookware must be formed of material which is at least as polishable as rolled solid aluminum sheet, unless additional organic or inorganic coatings are applied on the utensils.

A great majority of metal cookware is formed of stamped, pressdrawn, spun or otherwise cold formed solid flat sheets. Rolled solid aluminum sheets with a commercial "mill finish" or prepunched discs thereof are both polishable and are available to the cookware industry and are suited for such forming operations. The surfaces of these sheets are free of pits, burrs, crevices or slates which easily loosen, rupture or delaminate in cold forming. When viewed under a microscope, the surfaces of such solid sheets exhibit grooves which are arranged in the direction of rolling. However, the depth of these grooves is only microscopic and thus polishability is not impeded. Observation with a similar microscope also shows that the surface of a "roll plated" laminate of steel and aluminum sheets, to which the present invention is directed, is substantially identical with that of a solid rolled aluminum sheet, and thus the polishability of such laminate is at least as good as that of rolled aluminum sheets proper. Moreover, no discernable difference exists in appearance to the naked eye between rolled solid and laminate sheets after polishing with conventional polishing equipment.

In contrast to the smooth and homogeneous surfaces of solid aluminum sheets and to those of "roll plated" laminates of sheets of steel and aluminum, schistous, inhomogeneous, castlike and porous aluminum layers are exhibited on the surfaces of sheets covered by methods other than roll plating. Therefore, the polishability of cookware made of the latter sheets is vastly inferior as compared to cookware made of either solid aluminum or of "roll plated" laminates, the latter of which is subject of this invention. Cookware made of "roll plated" laminates will at least match the life, cleanability and appearance of solid, uncoated aluminum utensils and will be vastly superior as compared to uncoated utensils made of sheets covered by methods other than roll plating.

In one form of prior art cookware, a "tri-component" utensil wall structure is purported to be formed of a "hot-dip" aluminized composite steel core sheet. Such "hot-dip" wall structure consists of an approximate 0.9 mm thick steel core and two aluminum layers, each of approximately 25 microns or 1 mil in thickness, covering the opposite faces of the steel core. Actually such "hot-dip" prior art cookware is formed of a material known commercially as "aluminized steel" and, as such, is not a "tricomponent" at all, but is a "quintcomponent". Specifically, an AlFe layer interface is formed between the steel core and its aluminum cover layers in "aluminized steel". This AlFe interface is both intentionally and inherently formed during the "hot-dip" aluminization of steel sheets to form this "quintcomponent" wall structure of such "aluminized steel" cookware. In contrast, the "roll plated" laminates of sheets of steel and aluminum of the present invention are of true "tri-component" wall construction and such AlFe interfacial layer is neither discernable nor measurable in these "roll plated" laminates.

One important drawback of the presence of the AlFe interfacial layer in the "aluminized steel" wall structure is the reduction in the effective thickness of the already thin aluminum layers to, at maximum, 18 microns, and frequently substantially lesser thicknesses. This lost aluminum thickness, moreover, can not be recovered by applying more aluminum during the dipping process, since any additional aluminum applied by this method substantially reduces the ability to draw or otherwise mechanically form the sheet material into the finished cookware shape, due to an increase in the likelihood of delamination of the aluminum and steel. These drawbacks are avoided by the "roll plated" laminate construction of the present invention.

The more homogeneous, pore-free and the thicker the aluminum cover layers on a steel core are, the more completely will corrosive attack be arrested and thus the longer lasting and more effective will be the protection of the rust prone steel core against corrosion. The castlike structure of aluminum in the "aluminized steel" which is deposited at random on the steel sheet by dipping, can not provide the pore free continuity and homogeneity of aluminum sheets or foils which are pressure bonded to the faces of a steel core by roll plating as in the present invention. Further the inferior resistance of "hot-dip" aluminized sheets to corrosion is further accentuated by press drawing, stamping and other cold forming steps as employed in the shaping of the cookware.

In shaping cookware, the limits of elastic deformation must be exceeded to effect the plastic deformation of the substrate. Rolled sheets of steel and aluminum of suitable properties, such as the "roll plated" laminates of the present invention, readily lend themselves to plastic deformation or "flowing" into the die with no adverse effects on the initially pore free continuity of the aluminum cover layers. In contrast, the castlike structures of the schistous and porous cover layers of "hot-dip" "aluminized steel" sheets are extremely prone to rupture, breaks, or tears, rather than to "flow" into the die when press drawn. Finally, and quite important, the substantial reduction in the aluminum thickness of "aluminized steel", substantially increases the likelihood of exposure of the steel core material through the already coarse, porous dipped aluminum layer.

In addition, the AlFe layers themselves in "aluminized steel" are highly brittle and thus lack the ductility essential for "flowing" in the press dies without ruptures and fractures. Another drawback of the AlFe interfacial layers increases the likelihood of corrosion due to the composition of the layers themselves. Metal substrates made by the "hot-dip" process exhibit various compositions of AlFe, such as $Al_3Fe$, $Al_5Fe_2$, etc. When cookware having such interfacial substrates is used, the carbon in the steel core and the effect of elevated temperatures encountered during cooking can contribute to the development of aluminum-carbode compositions such as $Al_4C_3$. Such aluminum-carbide compositions are highly unstable in the presence of water or vapors thereof without which very few cooking or dishwashing operations can be carried out. Cookware cold formed of "roll plated" laminates of sheets of steel and aluminum according to the present invention is substantially free of these AlFe interfacial layers and thus resist such corrosion.

Returning again to the subject of the thickness of the aluminum cover layers, this thickness will generally govern the corrosion resistance, life and value of the cookware. Since the thickness of the aluminum cover layers of a substrate formed by the "hot-dip" process is limited to approximately an 18 micron maximum as mentioned previously, the corrosion resistance, life and value of cookware made of "hot-dip" aluminized steel is substantially diminished. In contrast, the aluminum cover layers of the cookware of the present invention can be easily varied up to 10% of the thickness of the steel core. Not only is this important for the foregoing reasons, but such increased thicknesses also insures sufficient stability, without the excessive warp of the utensil and avoids spot heating which might burn the food.

The absolute minimum wall thickness of any metallic "top of the stove" cookware container is 0.7 mm. Thus, when the laminate of the present invention is employed, aluminum layers of up to 70 microns may be easily realized, which is 10% of the thickness of the steel core, and this thickness will not impede drawability, etc. In contrast, the maximum of only an 18 micron thickness is obtainable with dipped "aluminized steel" regardless of the core thickness.

In addition to the superior polishability, pore free homogeneity, superior cold forming or "flow" capability, and the much larger thickness of the aluminum cover layers of the roll plated cookware of the present invention, another extremely important feature of the present invention is its ability to be coated.

At the present state of the art, examples of some coating finishes are tabulated in Table No. 1 as follows:

TABLE NO. 1

| Cookware Type | Interior Coating | Comment | Exterior Coating | Comment |
| --- | --- | --- | --- | --- |
| Press drawn carbon steel sheet | (a) 2-coat vitreous porcelain enamel. | preferred | (same as interior) | preferred |
| do. | (b) single coat "direct on" procelain vitreous enamel. | substandard spall resistance | (same as interior) | substandard spall resistance |

TABLE NO. 1-continued

| Cookware Type | Interior Coating | Comment | Exterior Coating | Comment |
|---|---|---|---|---|
| Press drawn solid aluminum sheets or aluminum covered steel sheets | (c) high buffed polished surface. | "hot dip" not suited | (same as interior) | "hot dip" not suited |
| do. | (d) single coat PTFE dispersion on acid pickled aluminum. | do. | (same as interior except PTFE is pigmented) | do. |
| do. | (e) single coat PTFE dispersion on acid pickled aluminum and ceramic anchor matrix is flame sprayed on metal under PTFE. | do. | (same as interior except PTFE is pigmented) | do. |
| do. | (f) 2-coat pigmented PTFE system on grit blasted metal. | do. | | |
| do. | (g) 2-coat pigmented PTFE system on grit blasted metal and ceramic anchor matrix is flame sprayed on metal under PTFE | do. | | |
| do. | (h) 2-coat pigmented PTFE system on grit blasted metal and vitreous frit anchor is deposited on blasted metal and heat bonded in excess of 500°C. | do. | | |
| do. | (i) same as next above coating, but vitreous frit anchor applied on unblasted, alkaline micro-etched metal and heat bonded in excess of 500°C. | life is sub-standard where metal is "hot dip" | (j) single coat "direct-on" inorganic aluminum enamel on alkaline cleaned micro-etched metal and heat bonded in excess of 500°C. | life is sub-standard where metal is "hot dip" |

Most non-stick coating systems for aluminum cookware interiors employ materials in the PTFE (polytetrafluorethylene) family. The most widely used application techniques of these coatings are set forth in Table No. 1, at (d), (f) and (h). Approximately half of the external coatings on aluminum cookware are of "direct-on", one coat vitreous porcelain enamel as set forth in Table No. 1, in (j). The other half of external coatings on aluminum cookware utilize an organic material as applied by the method set forth for interior coatings in Table No. 1, in (d).

It is highly desirable that cookware lends itself for the maximum number or ideally, of course, for all of the surface finishing possibilities which are available and in demand. The cookware made of solid aluminum or of "roll plated" laminates of sheets of carbon steel and aluminum as in the present invention perform identically to each other with respect to the abovenoted finishing possibilities and therefore the cookware of the present invention fulfills the requirement for diverse surface finishes. Conversely, cookware made of "hot-dip" aluminized steel sheets or steel sheets covered in a manner other than by roll plating, falls short of this requirement in most respects.

A PTFE finish is by definition a self-lubricating, non-stick coating. Thus, it is designed to resist adhesion to everything, which, unfortunately, includes the surfaces of the cookware which are intended to be coated with such material. The adhesion of a 25 micron strip of a PTFE top coat to a prime coated metal is only between 10 to 20 pounds as determined by the laboratories of du Pont de Nemours.

For purposes of cookware coatings, aqueous suspensoids of PTFE are used. These suspensoids can contain coloring pigments and various wetting agents, as well as certain inorganic constituents in so-called "prime-coat" preparates. A "PTFE dispersion" as employed herein, denotes such suspensoids which are free of inorganic constituents and are applied directly onto the metal as prepared for reception of the PTFE. A "PTFE top coat" as employed herein, denotes suspensoids which are applied over a "prime coat", rather than onto the metal directly. A "PTFE prime coat" as employed herein denotes such suspensoids which contain inorganic constituents, and may include other mentioned constituents, and which is applied directly to the metal as prepared for reception of the PTFE.

All three of these PTFE suspensoids are deposited on cookware by conventional paint application methods, usually by spraying. The wet film is then furnace "sintered" at a temperature range from 400 to 460°C. At these temperatures, the aqueous carrier of the suspensoid and the wetting agents are volatilized and the PTFE particles form a film. Unlike thermosetting paints, PTFE particles do not form a film by crosslinking and, unlike thermoplastic paints, PTFE particles do not coalesce or "flow" together during heat bonding. It is only, in lieu of a better description, that the film forming mechanism of PTFE coatings is denoted by the term "sintering".

The tensile strength of a sintered PTFE film at room temperature is between 1500 to 3500 PSI, depending on thickness. (ASTM test D 638). The industry standards for non-stick cookware coatings call for a dry and free film thickness of only 25 microns, thus its strength is likely to be lower than these values.

A sintered PTFE film is soft, it scratches easily and thus it can abrade quite rapidly. In general, the life of such coatings is considerably shorter than the life of the metallic body of the cookware proper.

A sintered PTFE film is also ductile. Its elongation, at room temperature, is between 200 and 400 percent as determined by ASTM test No. D 638. A PTFE coated flat metal disc can thus be deep drawn into the form of a utensil without rupturing its finish.

A sintered PTFE film on cookware is also considerably and intentionally porous. Experiments and actual use tests substantiate that capillary liquids which are volatilized during cooking, tend to lift up PTFE films of low porosity from the metal.

Due to the intentional and necessary porosity of PTFE coatings, the metallic surface of the cookware underneath such coatings is exposed to the aggressive media of food contents in very much the same manner as the cooking surfaces of uncoated cookware. But while a slightly oxidized or corroded uncoated aluminum cookware may still be used without health hazard, any substantial interfacial corrosion between a PTFE coating and metal will cause the separation of the PTFE film and will render the non-stick cookware, as such, inoperative. Thus, it is at least as important to protect the metal interface from corrosion beneath a nonstick coating as it is to protect the surface of an uncoated utensil against corrosion. For the foregoing reasons the non-stick coating on cookware formed of "roll plated" laminates as in the present invention will have a life identical to solid aluminum cookware and both will provide a longer life than non-stick cookware covered by methods other than roll plating.

PTFE is inert to nearly all chemicals, except molten alkalis and a few perfluorinated compounds. Pure aluminum and aluminum alloys suitable for cookware contain no such constituents. Thus, during sintering the coating on the aluminum surface of the cookware, no known or discernable chemical reaction bonding occurs at the interface between the PTFE particles and the metal. A sintered film of "PTFE dispersion", can only be coupled mechanically to a metallic substrate, such as the aluminum surface of a cookware. Accordingly, this smooth aluminum surface must be made receptive to PTFE before the dispersion is spray-deposited.

In order to obtain a mechanical coupling between a film of "PTFE dispersion" and metal, and to assure a peel strength which meets industry standards, a controlled degree of cavities must be imparted into the initially smooth aluminum surface. The neck size of the intrusions of these cavities must considerably exceed the larges size PTFE particles in the dispersion and the intrusions then must widen to form flask-like ballooning cavities underneath the metal surface. Through their wide necks, a large number of anchor cavities can thus fill with the aqueous dispersions of PTFE before the water carrier evaporates. Then, during firing, the PTFE particles which fill the cavities beneath the metal surface, cohere into ball-shapes larger than the cavity necks, as well as cohere to the PTFE above the necks and on the metal surface through the necks of the anchor cavities. In this manner the PTFE film on the face of the cookware is bonded to the captured ball-shapes at a very large number of points on the film.

The method of imparting such flask-like ballooning cavities into aluminum sheets for coupling a PTFE film mechanically was devised by Tefal S.A. of France. The Tefal process consists of (1) masking all metal surfaces which are not to be PTFE coated, (2) cleaning of the unmasked aluminum surfaces, (3) immersion pickling of unmasked metal surfaces in concentrated aqueous solutions of hydrochloric and hydrofluoric acids, (4) immersing into a neutralizing solution, and (5) removing of the masking and thorough cleaning of the metal prior to spraying and firing the PTFE coating.

In commercially available dispersions, the size of the largest PTFE particles can reach 0.5 microns or more. Experience substantiates that the open necks of anchor or cavities underneath the aluminum surface should be approximately 10 times larger than this particle size to permit the intrusion of sufficient amounts of PTFE into the anchor cavities beneath the metal surface. The depth of the anchor cavities must be at least 5 times greater than the diameter of their necks to secure a sufficient PTFE flow by capillary action. This then demands that the metal be penetrated by the acid pickling media to a depth of 25 to 35 microns. Intrusions of such depths pose no problems in cookware made of either solid aluminum sheet or "roll plated" laminates which offer a minimum of 70 micron thick aluminum cover layers, since even where the cavity depth is 35 microns, a minimum of 35 micron aluminum thickness remains. However, cookware made of steel covered by other than roll plating are limited in thickness of the aluminum cover layers to only approximately 18 microns. Therefore, cookware of the latter wall construction is clearly inoperative for coupling and carrying PTFE coatings by way of acid pickled anchor cavities.

Due to several considerations with respect to the coupling of PTFE on an acid pickled aluminum, a "2-coat" PTFE cookware finish system was devised by du Pont de Nemours. In this 2-coat system, the aluminum surface is made receptive by grit blasting. Usually, non-ferrous abrasives of about 60 to 80 mesh are shot from close proximity onto the fully annealed surface of aluminum by blast guns powered with compressed air at approximately 100 PSI pressure.

The roughness of the blasted surface of the "2-coat" system should be 200 micro inches as measured by a "profilometer" or, as measured by a "permascope" which measures the height of the metal "peaks", should average 9.2 microns of "peak" height or "valley" depth on an area of approximately 100 mm² of the metal surface. As is well known by those skilled in the cookware coating art, the deepest individual "valleys" in the soft aluminum will be approximately twice as deep as the average depth of "valleys" which result from the most careful blast. A deepest valley depth somewhat in excess of 18 microns poses no problem for non-stick cookware made either of solid aluminum or of "roll plated" laminates as in the present invention which provides a minimum thickness of 70 microns for the aluminum cover layers over the rust prone steel core. In contrast, cookware made of steel sheets covered by methods other than roll plating offer a maximum thickness of only 18 microns for the aluminum cover layers. Accordingly, in the latter, the metal substrate deepest valleys break through the aluminum cover layers and will free the way for the aggressive media in the food or dishwashing agents to attack the steel core and will rapidly render such cookware and its non-stick coating inoperative.

In approving a non-stick utensil for service, among other qualitative requirements, the peel strength of the non-stick film must meet industry standards, for example the internationally followed quality control and test procedures of du Pont de Nemours.

The Tefal system, which couples a "PTFE dispersion" onto an acid pickled face of aluminum, meets the peel strength standard by a purely mechanical coupling between PTFE and the substrate. The theoretical maximum of the peel strength of such mechanically coupled non-stick coatings is essentially equal to the tensile strength of the PTFE film.

In contrast, in the "2-coat" system — or other PTFE multiple coat systems, a "prime coat" of low PTFE content is deposited on the cookware first and then a "top coat", which is richer in PTFE is applied over the "prime coat". The "prime coat" is deposited onto rough surfaces, such as either directly onto grit blasted aluminum or onto hybrid substrates, such as where a flame sprayed or heat bonded matrix is applied to the metal surface. Such surfaces lack the flask-like ballooning cavities of acid pickled aluminum and, thus, their mechanical coupling capability is inferior as compared to that of acid pickled aluminum. Therefore, the peel strength of a film of "PTFE dispersion" applied with no "prime coat", directly onto such blasted or hybrid surfaces will be substandard. The "prime coat" is intended to augment the mechanical coupling deficiency of these surfaces, so that the peel strength of the complete "2-coat" system meets industry standards.

Most cookware "prime coats" differ from "top coats" and from "PTFE dispersions" in the following major aspects: (1) generally prime coats contain less PTFE, (2) prime coats have inorganic constituents in addition to the organic constituents, (3) the thickness of prime coats on cookware is substantially less than that of top coats, and (4) prime coats are not sintered fully prior to spraying and firing the "top caot". The bonding mechanism between a PTFE prime coat and a cookware substrate is not exactly known. Electron microscopic and electron probe studies relative to the bonding mechanism of aluminum/-enamel systems show certain analogies, however, with the bond between "2-coat" PTFE systems and cookware substrates. These studies suggest that the predominant bonding mechanism is an interaction or diffusion of the inorganic constituents of the coating and the aluminum. In a system employing a frit matrix, the diverse inorganic constituents of the frit and the metal appear to interact or diffuse, on the one hand, and then the inorganic constituents of the PTFE prime coat and the hybrid substrate, appear to interact or diffuse, on the other hand. In order to achieve a suitable bond by such mechanism, the two coating materials, i.e. the frit matrix and PTFE "prime coat", must have sufficient "affinity" to interact or diffuse and at the same time, each of these two coating materials and the aluminum must also be able to interact or diffuse. The solid particles in both the frit and the PTFE prime coat are comparatively small. Thus diffusion among the constituents of coating materials can occur on a substantially larger area than the diffusion or interaction of coating materials and aluminum. Indeed, only in rare cases can product failures be traced to separation between the frit and the PTFE prime coat. The failures of most "2-coat" systems are predominantly separations between the metal and either the frit or the prime coat or both.

The above mentioned electron microscopic studies also suggest that diffusion of aluminum and inorganic constituents of its coatings is more intensive along the grain boundaries of a rolled metal sheet than over its grains proper. Therefore, the larger the percentage of the area of grain boundaries in the total area of the coated surface of the metal, the higher is the probability for obtaining a solid and uniformly strong bond of the coatings. In other words, inhomogeneity of the metal surface and coarse grains are archenemies of solid bonds and durable coatings.

Appropriately rolled and annealed aluminum sheets exhibit homogeneous and fine grained metallographic structures. The same is true for the cover layers of "roll plated" laminates as in the present invention, since these cover layers are rolled aluminum sheets. Both of these cover substrates thus fulfill the prerequisites of long life coatings. On the other hand, the schistous, porous, cast-like structure of the cover layers of aluminum steel, where the steel is covered by methods other than roll plating, do not meet this prerequisite. The inferiority of the latter substrate in sheet form is accentuated by the incapability of the crystal lattice of its aluminum cover layers to rehomogenize after cold forming the sheet into the shape of a utensil.

Press drawing causes plastic deformation of the metal sheet. The unavoidable result is coarse graining of the metal through the stretching of its crystal lattice. The most severe coarse graining and other distortions in the metallographic structure of aluminum cookware occurs in the vicinity of the transition between its bottom and side wall and at bulges above the "skirts" of covers. The crystal lattice of deep drawn aluminum should be rehomogenized by heating the cookware and cover rapidly to a temperature of approximately 280° to 320° C prior to the spraying of any coating, either frit or PTFE. In this respect, cookware made of both solid aluminum and "roll plated" laminates as in the present invention exhibit homogeneous and fine grain structures. Steel covered by other methods does not.

In summary, the cookware formed of a "roll plated" laminate of sheets of carbon steel and aluminum as in the present invention exhibits durability, life and other qualitative features equal to that of solid aluminum cookware and each finish or coating applicable on the latter is suited for the former. In contrast, cookware made of steel sheets covered with aluminum by methods other than roll plating will be either substandard or inoperative.

Another noteworthy feature of the cookware of the present invention is the ability of its metal substrate to be cold worked to protect the sheared edges of the mild steel core which would otherwise be exposed, for example, about the upper rim of the cookware container or around the "skirt" of the cover. Such edges must be sealed in some manner to prevent corrosion and rust which will occur during use of the cookware units.

One way in which these corrodible plies could be protected is by the use of rust proof rim elements or by coating electrolytically, galvanically or otherwise, the exposed edges of the steel core to prevent corrosion during use. Laminated cookware units of mild steel-stainless steel lamina have been employed in the past in which the exposed sheared end edge of the mild or carbon steel core is protected by drawing the harder stainless steel cladding material over the edge of the mild steel to seal the exposed edge. However, an important feature of these prior containers includes deforming the mild steel core which is softer than the external stainless steel plies. Accordingly, in these prior cookware units of mild steel-stainless steel laminate construction, the mild steel core ply is the ply which is primarily deformed during the edge sealing operation such that the mild steel core is drawn into a sharp knife edge which necessitates further fabrication steps of folding and other forming. Moreover, since the mild steel core in the sealed end product is anodic relative to the non-corrosible stainless steel ply which is to protect it in these prior constructions, electrochemical deterioration and corrosion of the mild steel will frequently occur during use, particularly if the stainless steel layer is broken in any manner.

In the laminated cookware unit of the present invention, an otherwise sheet edge of the rust prone mild steel core may be readily protected by the relatively inert aluminum cover sheet without deforming the steel core which is to be protected and without the need for further forming steps to neutralize sharp knife edges and the like. In the present invention, the exposed edge of the ferrous steel core may be protected simply by drawing the softer non-ferrous roll plated aluminum cover sheet such that a portion of the latter extends beyond the edge of the steel core and this portion is then folded over the exposed ferrous steel edge. Moreover, edge corrosion resistance is substantially enhanced, since the aluminum is anodic relative to the ferrous steel.

In a principal aspect of the invention, a laminated cookware unit component includes a first sheet comprising a ferrous metal core and pore free second and third cover sheets of aluminum or aluminum alloys suited for cookware. The second and third sheets are roll plated and bonded to opposite faces of the first sheet, the first core sheet being sandwiched between the second and third cover sheets. The second and third sheets may be polished or buff finished or, alternatively, the exterior or the interior or both of these sheets of the cookware unit may be coated.

In another principal aspect of the invention, a cookware unit includes an exposed edge and a protective covering overlies the normally exposed end of the first ferrous core adjacent the edge, the protective layer comprising a portion of one of the non-ferrous cover sheets being drawn to a length to extend beyond the end of the first steel core and folded over its end.

Another principal aspect of the invention involves a method for sealing the edge of a laminated cookware component having a first steel core which is subject to deterioration. The method includes the steps of drawing a second, softer cover sheet such that the cover sheet extends beyond the end of the first steel core adjacent the edge of the cookware component which is to be sealed, and this extended portion of the cover sheet is then folded over the end of the first core to seal the end beneath the folded over portion of the second sheet.

These and other objects, features and advantages of the present invention will be clearly understood upon consideration of the following detailed description.

BRIEF DESCRIPTION OF THE DRAWING

In the course of this detailed description, the drawing will be frequently referred to in which:

FIG. 1 is a broken perspective view of a cookware unit including a cookware container and a cover as components and in which the principles of the present invention are incorporated, the thickness of the components being somewhat exaggerated to emphasize the roll plated laminated construction; and FIGS. 2-4 are broken, enlarged, cross-sectional views of the side wall of the cookware container shown in FIG. 1 and showing the steps contemplated by the present invention for sealing the edges of the cookware components.

DETAILED DESCRIPTION OF THE PREFERRED EMBODIMENTS

Referring particularly to FIG. 1, a cookware unit, generally 10, incorporating the principles of the present invention is shown which may include, as components, a cookware container 12 and a cover 14 therefor. The container 12 is of generally conventional shape in which an open topped cavity 16, for receipt of the materials to be prepared in the container, is defined by a bottom wall 18 and an upstanding, generally cylindrical side wall 20 having a suitable insulative handle 22 attached thereto. The upper end of the side wall 20 is sheared to define an upper edge or rim 24.

The cover 14 comprises a generally disc-shaped portion 26 having a handle 27 thereon. The portion 26 is formed inward and downward about its perimeter to define a downward extending annular flange or skirt 28 having a lower edge 29. The external diameter of annular skirt 28 is preferably somewhat smaller than the disc portion 26 and approximately the same diameter as the internal diameter of the container side walls 20 such that when the cover is positioned on the container, the skirt 28 will easily fit inside the container and the overhanging portion 30 of the cover will rest upon container edge 24 to secure the cover against inadvertent removal from the container during use. It will be understood that numerous other suitable cover constructions, other than the described skirt construction, may be employed to secure the cover to the container during use.

Preferably both the container 12 and the cover 14 are formed of a roll plated laminated material which is stamped, press drawn or flow formed cold otherwise into the shape of the finished unit. One, and preferably both, of the laminated cookware unit components comprise a rolled ferrous steel core sheet 32 formed of a relatively hard mild or carbon steel of cold forming quality and this relatively thick core sheet is roll plated on one and preferably both sides, by relatively thin, continuous and dense sheets 33 and 35 of a softer, inert rolled sheet material, preferably aluminum or alloys thereof suited for cookware.

The already rolled aluminum sheets 33 and 34 are roll plated or otherwise pressure bonded upon the core ply 32 such that the aluminum sheet is pressure bonded to the steel core substrate. The thickness of each of the aluminum sheets 33 and 34 is preferably up to 10% of the thickness of the steel core. In any event, the minimum thickness of sheets 33 and 34 should preferably be at least 35 microns after their surfaces have been made receptive to coatings. At such thicknesses the roll plated cover layers on the cookware unit will exhibit all of the qualities of units formed of solid aluminum sheets, e.g. metallurgical properties, homogeneity and other physical and chemical properties. Thus, these aluminum cover sheets may be readily drawn, polished, acid pickled and blasted or otherwise scored after they have been roll plated to the steel core ply and even after they have been formed into the shape of the cookware unit. Blasting and pickling or other preparation of the external surfaces of the clad aluminum cover sheets is preferred in order that these surfaces will be receptive to cookware coatings, such as interior vitreous frit anchor base for non-stick PTFE coatings or exterior coating, organic and vitreous inorganic alike, examples of which are set forth in TABLE NO. 1. In addition, the thickness of the aluminum cover sheets should be sufficient to accommodate the drawing of the roll plated laminate for the shaping of the cookware unit without rupture or damage to the aluminum cover layers and the drawing of at least one of these cover layers, as will hereinafter be described, for sealing the exposed edge end 36 of the ferrous steel core 32 of container or cover. Where the edge 36 is to be sealed as described herein, the ratio of the thickness of the aluminum cover layers or layers 33 and 34 to the thickness of the steel core 32 should preferably be between 1 to 6 and 1 to 20.

Thus, it will be understood that the container 12 and cover 14 may be readily finished in several different ways. The interior of the container 12 and/or cover 14 may be coated with a suitable PTFE nonstick system, including any one of the several set forth in TABLE NO. 1. In addition, the exterior of container 12 and/or cover 14 may be coated with a suitable decorative enamel high temperature or otherwise, also as set forth in TABLE NO. 1. Finally, in the alternative, either the exteriors or interiors of either or both the container or cover may be highly polished.

Referring now to FIGS. 2-4, although the aluminum cover layers 33 and 34 protect the major surfaces of the ferrous steel core 32 against corrosion during use of the cookware unit, some provision must be made to seal the exposed edge end 36 of the ferrous steel core of both the container 12 and the cover 14.

To seal this sheared end edge, a suitable drawing wheel W is urged against one of the aluminum cover layers, such as the internal layer 33 as shown in FIG. 2. The wheel W initially is positioned well beneath the upper edge 38 of the aluminum ply 33 and is brought to bear against the aluminum ply so as to effect a force F against the material. Either the wheel W is then moved upward from the position shown in solid in FIG. 2 toward that shown in dot and dash while maintaining its force F against the aluminum ply 33, or the wheel W is fixed and the container is moved downward against the wheel. In either event, either the wheel or the container is moved relative to the other while the force F is exerted by the wheel so as to cause a drawing or flow forming action on the aluminum cover layer 33 in the direction of arrow D.

Since the aluminum layer 33 is substantially softer than the ferrous steel core 32, the aluminum will elongate so as to become thinner at 40 and longer, while the harder ferrous steel core will remain substantially unchanged in thickness or shape. Thus, cover layer 33 will become longer than the steel core 32 such that a portion 42 of the aluminum sheet will now extend beyond the edge end 36 of the steel core as shown in FIG. 3. The aluminum cover sheet is elongated by an amount which is sufficient to insure that this extended portion 42 extends by an amount which is at least as great as the thickness of the ferrous steel core 32, but that the thickness of the elongated aluminum sheet 40 is still sufficient to protect the ferrous core.

Once the aluminum cover layer 33 has been elongated so as to form the extended portion 40, this portion is then rolled or folded over the exposed edge end 36 of the ferrous core by wheel W to seal the edge beneath the protective covering now formed by the folded-over drawn portion 40.

Although in the above description of the preferred embodiment of the invention, cover sheets 33 and 34 have been described as being aluminum, it will be understood that these plies may be rolled of aluminum alloys and other materials which are softer than the steel core to arrive at the clad construction and/or the edge sealing operation hereinabove described. In addition, although a roll plated laminate of sheets of ferrous steel and aluminum is preferred since aluminum is anodic relative to the ferrous steel to substantially reduce the likelihood of electrolytic corrosion of the ferrous steel during use of the cookware unit, other roll plated laminate materials may be employed in which the external cover layer is anodic relative to the core. Moreover, where the rolled edge of the present invention is to be practiced, the plies 33 and 34 may be formed of different materials so long as the ply which is to be elongated and folded is softer than the core ply.

It should be understood that the embodiments of the present invention which have been described are merely illustrative of a few of the applications of the principles of the invention. Numerous modifications may be made by those skilled in the art without departing from the true spirit and scope of the invention.

What is claimed is:

1. A multiply, laminated cookware unit component comprising
   a core comprising mild steel,
   continuous second and third layers comprising substantially homogeneous and pore-free rolled nonferrous sheets of aluminum or alloys thereof pressure bonded directly to said steel core, said core being sandwiched between the sheets of said second and third layers such that one of said second and third layers is positioned on the side of said core facing the food which is to be prepared by said cookware unit component.

2. The multiply unit component of claim 1 wherein said core is a sheet.

3. The multiply unit component of claim 1 wherein the minimum thickness of said second and third layers is at least 35 microns.

4. The multiply unit component of claim 1 wherein at least one of said second or third layers is polished.

5. The multiply unit component of claim 1 wherein at least one of said second or third layers is coated with a heat bonded cookware finish.

6. The multiply unit component of claim 5 wherein said heat bonded coating comprises an inorganic coating heat bonded to at least one of said second and third layers at a temperature in excess of 500° C.

7. The multiply unit component of claim 5 wherein said heat bonded coating is of the PTFE family.

8. The multiply unit component of claim 1 including an exposed edge on said unit at which the end of said core is exposed, a protective covering comprising a portion of one of said second and third layers adjacent said edge drawn to a length to extend beyond said edge and folded over the end of said core.

9. The multiply unit component of claim 8 wherein said second and third layers are anodic relative to the material of said core.

10. The multiply unit component of claim 1 wherein at least one of said second and third layers is substantially inert and anodic relative to said core and softer than the mild steel of said core and having a minimum thickness of at least 35 microns, and
an inorganic vitreous coating bonded directly to the surface of at least one of said second and third layers at a temperature in excess of 500° C.

11. The multiply laminated component of claim 10 wherein said second and third layers are roll plated to said mild steel core.

* * * * *